May 28, 1968  H. L. MILLER ET AL  3,385,006
METHOD AND APPARATUS FOR ABRADING ARTICLES
Filed Oct. 21, 1965  4 Sheets-Sheet 1
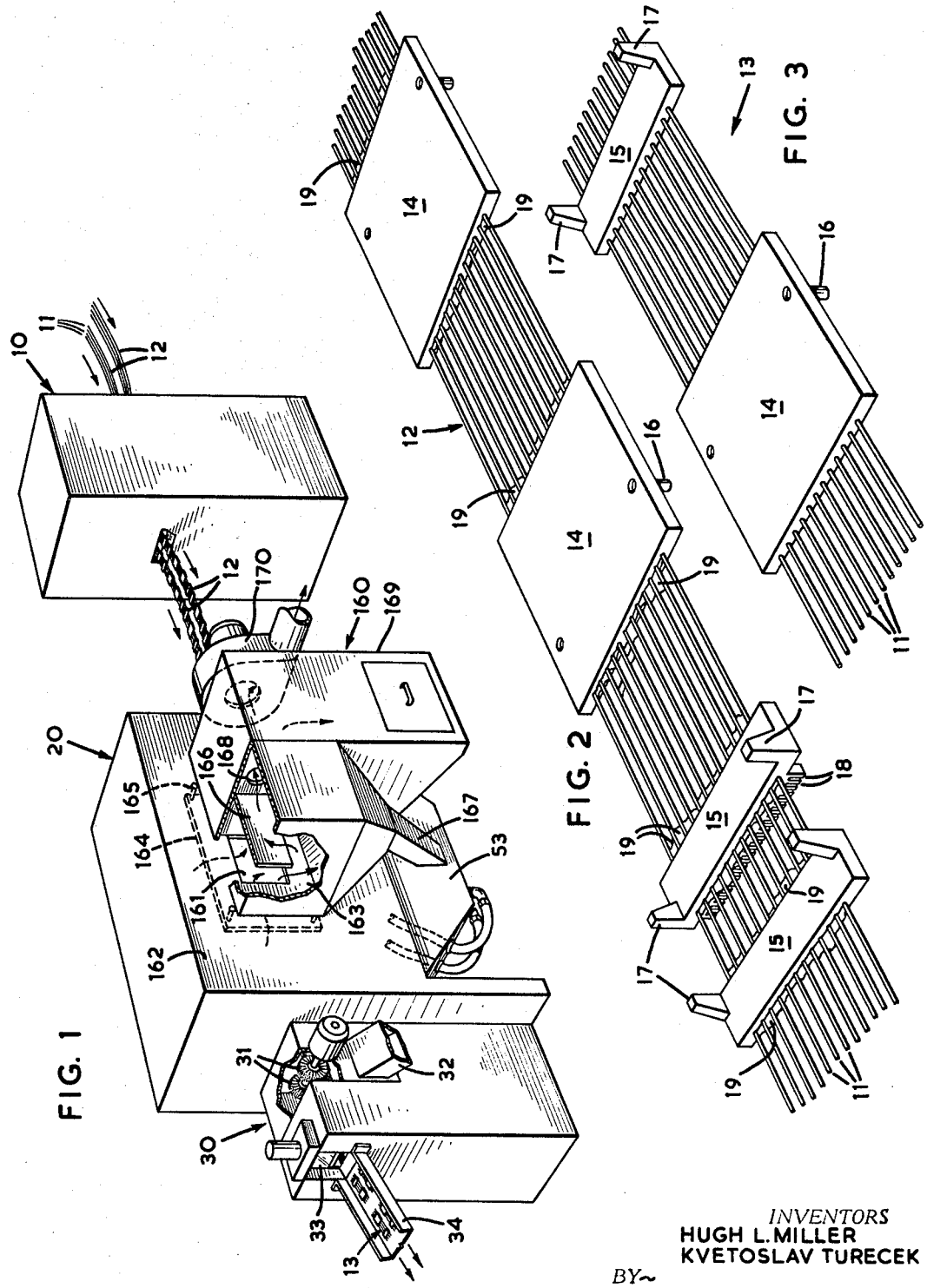
INVENTORS
HUGH L. MILLER
KVETOSLAV TURECEK
BY
Westell & Hanley INVENTORS
HUGH L. MILLER
KVETOSLAV TURECEK
BY Westell & Hanley May 28, 1968 H. L. MILLER ET AL 3,385,006
METHOD AND APPARATUS FOR ABRADING ARTICLES
Filed Oct. 21, 1965 4 Sheets-Sheet 4

INVENTORS
HUGH L. MILLER
KVETOSLAV TURECEK
BY~
Westell & Hanley

United States Patent Office 3,385,006
Patented May 28, 1968

3,385,006
METHOD AND APPARATUS FOR ABRADING ARTICLES
Hugh L. Miller, Downsview, Ontario, and Kvetoslav Turecek, Brampton, Ontario, Canada, assignors to Northern Electric Company Limited, Montreal, Quebec, Canada
Continuation-in-part of application Ser. No. 362,552, Apr. 16, 1964, which is a division of application Ser. No. 175,690, Feb. 26, 1962. This application Oct. 21, 1965, Ser. No. 499,248
19 Claims. (Cl. 51—8)

ABSTRACT OF THE DISCLOSURE

A method and apparatus for abrading articles by impingement of particulate abrading material, where the material can pass through the article. The material is directed against one side of the article, collected on its other side, accelerated and redirected against that other side whereby both sides of the article are abraded.

This application is a continuation-in-part of applicant's prior copending United States application Ser. No. 362,-552, filed Apr. 16, 1964, now abandoned, which application is a division of applicant's United States application Ser. No. 175,690, filed Feb. 26, 1962, now abandoned.

The present invention relates to the moulding of articles and more particularly to a method and apparatus for abrading or cleaning articles such as combs for wire spring relays to remove flash formed by the plastic moulding operation.

In the manufacture of combs for wire spring relays one or more blocks of insulating material such as Bakelite are moulded around a row of parallel spring wires aligned in a moulding die. For mass production the wires are advanced endlessly through the die in a step-by-step operation and the resultant tandem combs are severed to obtain individual units as the endless band emerges from the die.

Flash inevitably is formed between the parallel wires when moulding the blocks of insulating material around the wires. To remove this flash it has been customary to collect the individual combs as they are severed on emergence of the band from the die and place them in a grit blasting unit where ground walnut shells are directed against the wires. In this step care must be taken to protect ancillary projections such as lateral rows of guide pins or teeth located on one or both sides of one or more of the blocks in each comb. After removal of the flash in this manner, the combs are loaded into special slotted magazines for subsequent manufacturing operations.

It is an object of the present invention to provide a method and apparatus for abrading an article of a form which allows transverse passage of particulate material through the article.

It is another object of the invention to provide a mechanism for automatically cleaning wire spring relay combs moving endlessly from a moulding die.

Still another object of the invention is to provide an apparatus to advance in controlled sequence, and abrade, a continuous strip of wire spring relay combs emanating in parallel from a moulding die.

A further object of the invention is to provide an apparatus of the above type in which delicate parts of the mould blocks are protected from damage during the abrasion step.

To achieve these and other objects the invention in its broadest aspect resides in a method of abrading an article of a structure permitting transverse passage of particulate abrasive material therethrough, comprising the steps of directing particulate abrasive material against one side of the article, collecting on the other side of the article material passing therethrough, accelerating the collected material, and redirecting the collected material against other side of the article at an area spaced from the area of collection. Preferably the article is advanced in a path traversing the two areas. Material in strip form is particularly adaptable to this method and may be advanced step by step to direct the particulate material against specific areas of the article.

The apparatus of the invention comprises means for spraying a particulate abrasive material at one side of an article allowing passage of the material therethrough and means for redirecting that portion of the material passing through the article to impinge upon the other side of the article, the redirecting means including means to increase the velocity of the redirected material for impingement upon the other side of the article. The redirecting means is preferably a tubular venturi duct having an inlet end to receive the particulate material first passing through the article and an outlet end adjacent the other side of the article, the tubular member decreasing in cross-section from the inlet end to the outlet end to achieve the venturi effect.

An example embodiment of the invention will now be described with reference to the accompanying drawings in which:

FIGURE 1 is a rear schematic perspective view, partly in section, of apparatus for producing wire spring relay combs, including the apparatus of the present invention;

FIGURE 2 is a perspective view of an endless band of comb assemblies continuously produced by a moulding die;

FIGURE 3 is a perspective view of a single comb, cleaned by the apparatus of the present invention and severed from the endless band of FIGURE 2;

Figure 4:
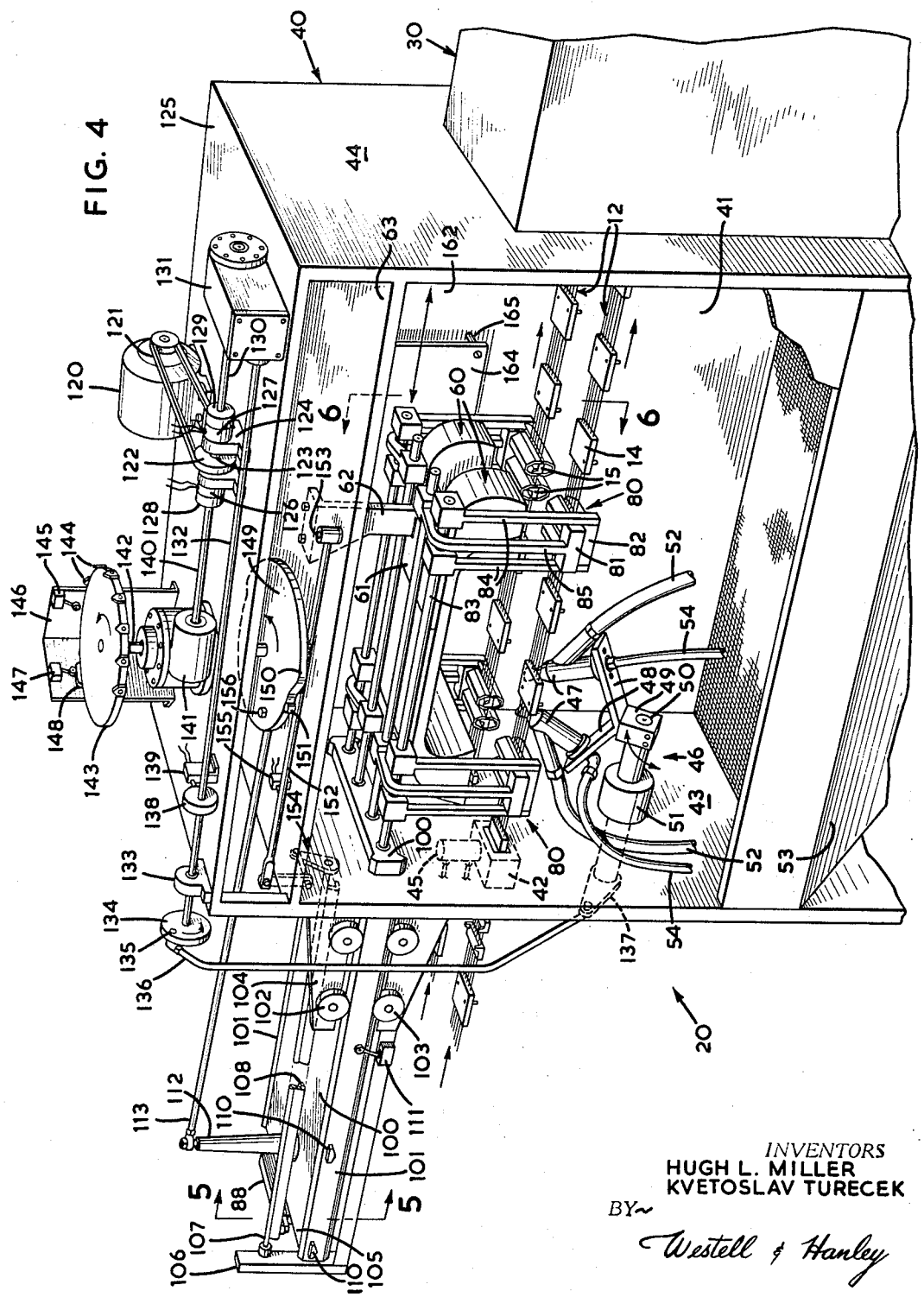
FIGURE 4 is a front view in perspective of the abrading mechanism of the invention.

FIGURE 1 of the drawings shows a moulding die 10 fed with a plurality of endless, parallel spring wires 11 forming two parallel bands 12. A series of blocks are moulded by die 10 about wires 11 to form a series of combs 13 in tandem along each band 12 as shown more particularly in FIGURE 2 of the drawings. FIGURES 2 and 3 of the drawings show an illustrative type of comb 13 which consists of a wide block 14 and a narrow block 15. Pins 16, for subsequent use in assembling the relay, protrude laterally from block 14 and similar posts 17 protrude laterally from narrow block 15 which also contains a row of relatively fragile guide fins or teeth 18. Because of the particular type of moulding operation carried out by die 10, combs 13 are formed in back-to-back relationship on bands 12 as shown in FIGURE 2 of the drawings. The formation of flash 19 between wires 11 adjacent each block 14 and 15 on strips 12 during the moulding operation is also shown in FIGURE 2 of the drawings. It is the purpose of the present invention to remove flash 19 from bands 12.

Bands 12 pass from moulding die 10 in a step-by-step operation as pairs of blocks 14 and 15 are moulded simultaneously on both bands, and are received by abrading apparatus 20, to be described, for removal of flash 19. On emergence from abrading apparatus 20, bands 12 pass into a brushing and cutting device 30. A continuously operating pair of brushes 31 remove any abrading material or loose flash still adhering to bands 12, the material removed in this manner being dropped through a chute 32 for disposal. A cutting knife 33, synchronized with the step-by-step operation of abrading apparatus 20, severs individual combs 13 from bands 12. As individual combs 13 are cut from bands 12 by knife 33 they pass by gravity down a chute 34 for delivery to a collection point, such as a stacking unit, for subsequent manufacturing operations.

FIGURE 4 of the drawings shows in detail the abrading apparatus 20 of the invention. Apparatus 20 consists of a housing 40 having a main chamber 41 which is traversed by bands 12 moving in a horizontal direction. Bands 12 enter chamber 41 through apertured ingress blocks 42 in one end wall 43 of housing 40 and leave the chamber through apertured egress blocks (not shown) in the opposite end wall 44 of the housing. Ingress blocks 42 each include a controlled releasable clamping mechanism 45 operable against bands 12.

A grit blasting mechanism is positioned adjacent the underside of bands 12 and is adapted to oscillate in a path lateral to that of the bands. Grit mechanism 46 is mounted on end wall 43 of housing 40 beneath ingress blocks 42 and consists of a pair of nozzles 47 each mounted on a flange 48 which is fixed to a block 49 keyed to the free end of a shaft 50 passing through a journal bearing 51 in end wall 43. Each nozzle 47 is fed with particulate abrasive material or grit through a flexible tube 52 leading from a hopper or bin 53 located at the bottom of housing 40 beneath chamber 41 and containing particulate abrasive material or grit such as nylon pellets. A valve controled air hose 54, connected to suitable air compression means, not shown, also feeds into each nozzle 47. The air from hose 54 passes across the outlet of grit tube 52 within the nozzle to create a venturi effect and draw grit by suction from bin 53. The grit, entrained in the air, is passed out of nozzles 47 at a high velocity to impinge on the underside of bands 12 along a preselected transverse line as the nozzles are oscillated.

Figure 7:
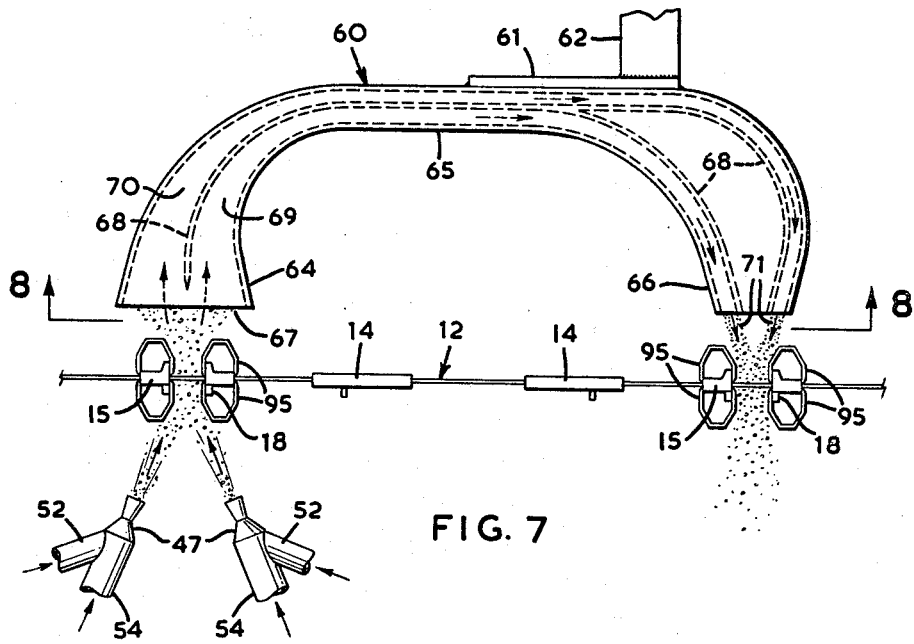
FIGURE 7 is a cross-section of the ducts for collecting, transferring and accelerating the particulate abrading material, taken along the line 7—7 of FIGURE 6 with the clamping jaws in closed position.
Figure 8:
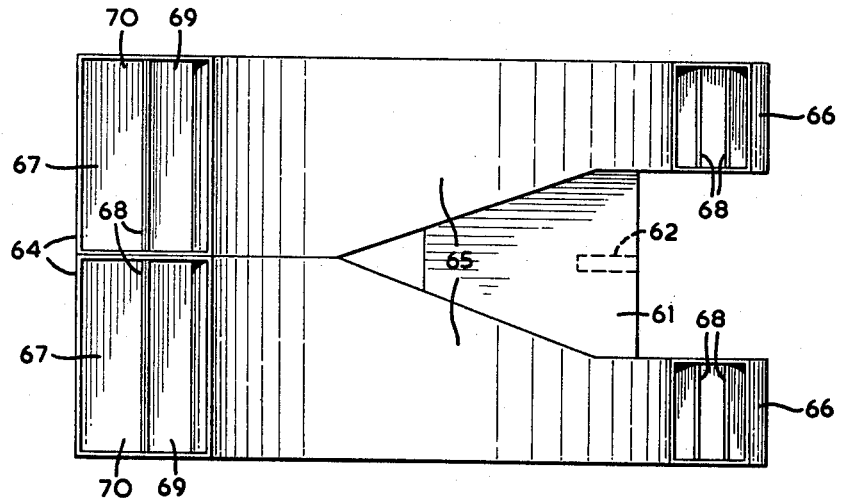
FIGURE 8 is a view of the ducts taken along the line 8—8 of FIGURE 7.

As shown more particularly in FIGURES 7 and 8 of the drawings, a pair of tubular members or ducts 60 are located above bands 12 within chamber 41, the ducts being fixed to a horizontal cross plate 61 which is integral with a vertical leg 62 fixed to roof 63 of housing 40. Each of the two ducts 60 is symmetrical about a vertical plane passing between bands 12 and consists of a vertical inlet 64, an elongated horizontal throat 65, and a vertical outlet 66. Mouth 67 of inlet 64 is located adjacent the upper side of bands 12 in the path of travel of air and grit emanating from nozzles 47. To collect a maximum amount of grit from nozzles 47 passing through bands 12, mouth 67 is flared outwardly along the path of the bands and the mouths of the two ducts are also contiguous whereby they jointly overlie the entire lateral path of nozzles 47, as clearly seen in FIGURE 8 of the drawings viewing the duct assembly from its underside. To provide for two converging streams emanating from each duct 60 towards the upper side of each band 12, a divider 68 is located laterally within each duct to form a pair of channels 69 and 70 which diverge as they approach their downstream ends in order to have a terminal convergence, as indicated by arrows 71, along a line traversing each band 12. Ducts 60 diverge laterally with respect to each other towards the downstream ends of channels 69 and 70 to locate their terminal portions directly above bands 12 and also to narrow the channels towards their downstream ends, thus providing the venturi means required to accelerate the grit passing through the channels.

Figure 5:
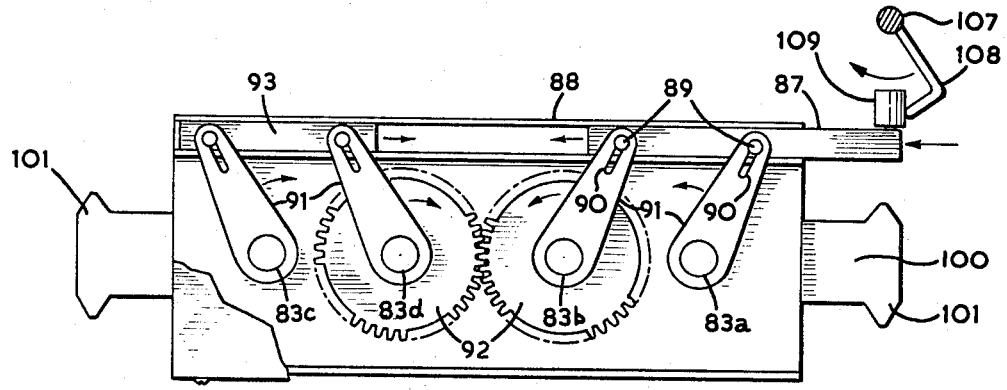
FIGURE 5 is an end view of the carriage mechanism taken along the line 5—5 of FIGURE 4.
Figure 6:
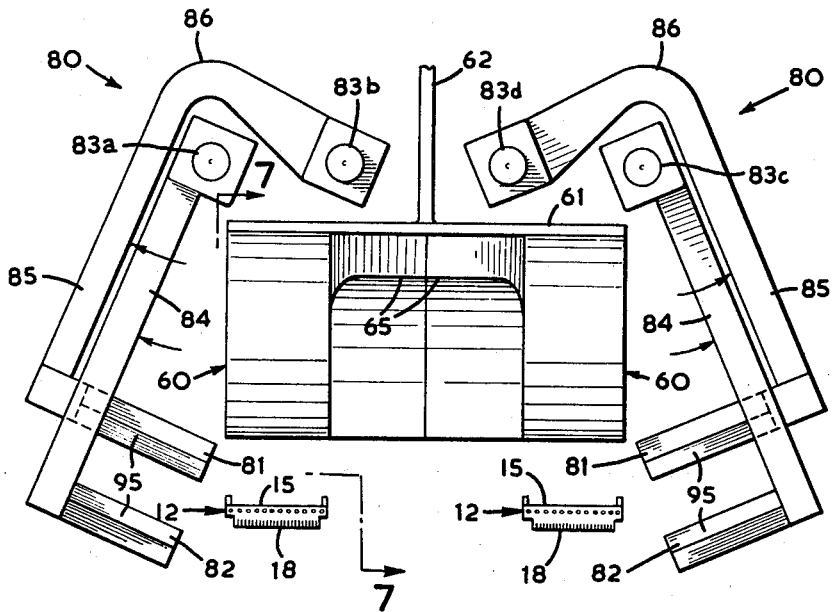
FIGURE 6 is an end view of the clamping jaws taken along the line 6—6 of FIGURE 4 but in open position.

Bands 12 are advanced through chamber 41 by means of synchronized clamps 80 which move in step-by-step sequence along the path of the bands. There are four clamps 80, two for each band, each clamp comprising an upper jaw 81 and a lower jaw 82. Each jaw 81 and 82 is pivotally mounted on a shaft 83 in a manner such that when the shafts 83 are rotated the upper and lower portions of the jaws will separate one from another at the same time that the clamp swings outwardly from the path of its associated band 12 and will come together when the clamp swings inwardly. The construction and orientation of clamps 80 is best seen in FIGURE 6 of the drawings which shows four shafts 83 parallel one to another in a horizontal plane above bands 12 and also above ducts 60. Lower jaw 82 of the two clamps 80 associated with one band 12 is supported on the free end of a pair of cantilever arms 84 keyed to an outer shaft 83a of shafts 83, upper jaw 81 of the same two clamps being supported on the free end of a cantilever arm 85 keyed to an inner shaft 83b of shafts 83 and elbowed at 86 to clear shaft 83a. Jaw 81 slides freely between cantilever arms 84. The two clamps 80 associated with the other band 12 is similarly constructed and are keyed to an outer shaft 83c and an inner shaft 83d of shafts 83. The rotation of shafts 83 is governed by a linkage arrangement shown in FIGURE 5 of the drawings. The pair of shafts 83a, 83b are rotated by a link bar 87 slidable longitudinally in a horizontal guideway 88 transversely of shafts 83. Bar 87 carries a pair of lateral pins 89 which are slidably engaged each in a slot 90 of a crank arm 91 keyed to shafts 83a, 83b respectively. Shafts 83c, 83d are in like manner pivotally connected with a link bar 93 freely slidable in guideway 88. A pair of interengaged spur gears 92 one keyed to each of the two centre shafts 83 provide synchronous rotation of the two sets of shafts in opposite directions when link bar 87 is moved in guideway 88, thus opening or closing all clamps 80 simultaneously. Link bar 87 is spring-biased away from link bar 93.

The function of clamps 80 is twofold, first to protect the frangile teeth 18 of blocks 15 on bands 12 from breakage by the action of the particulate abrasive material against bands 12, and second to advance bands 12 through chamber 41. Both upper jaw 81 and lower jaw 82 each comprise a pair of elongated parallel arcuate shells 95 adapted to receive a pair of back-to-back blocks 15 including posts 17 and teeth 18. Shells 95 are machined to provide a close but free fit over blocks 15 to allow the removal of adjoining flash by the particulate abrading material Besides protecting teeth 18 on blocks 15, clamps 80 when closed are in a position to advance bands 12 on forward axial movement of the shafts 83.

To advance bands 12 within chamber 41 the ends of shafts 83 are mounted on a carriage 100 which is horizontally slidable through end wall 43 of housing 40. The lateral edges of carriage 100 each carry a flange 101 which act as rails moving between a set of upper guide wheels 102 and lower guide wheels 103 journalled in mountings 104 fixed externally on wall 43 of housing 40. Shafts 83 are rotatable axially within carriage 100. The linkage arrangement of cross bars 87 and 93, guideway 88, crank arms 91 and gears 92 (as shown in FIGURE 5) is mounted on the outer end 105 of carriage 100. An L-shaped frame 106 is also mounted on housing 40 and extends beyond the furthest outward limit of travel of carriage 100. A rod 107 is axially journalled to the upright end of L-frame 106 and to end wall 43 of housing 40. Rod 107 carries an angled bar 108 extending substantially the full length of the rod, the bar being engageable with a roller 109 mounted at one end of link bar 87 (as shown in FIGURE 5). One flange 101 of carriage 100 also carries a pair of spaced lugs 110 engageable, in the travel of the carriage, with a micro-switch 111 mounted on frame 106. An upright post 112 mounted on carriage 100 adjacent its rear end 105 has one end of a rod 113 pivotally connected to its upper end.

The drive mechanism of the apparatus, as shown in FIGURE 4 of the drawings, comprises a motor 120 continuously driving a belt 121 which engages a pulley 122 keyed to a shaft 123 journalled in bearings 124, motor 120 and bearings 124 being mounted on a platform 125 raised above top 63 of housing 40. Electrically operated clutches 126, 127 and associated brakes 128, 129 are mounted one at each end of shaft 123. A shaft 130 coupled with shaft 123 by clutch 127 drives, through a reducing gear assembly 131, an oscillator shaft 132 which is journalled adjacent its free end in a bearing 133. The free end of shaft 132 carries a disc 134 having an eccentric pin 135. A crank arm 136 is pivotally mounted at one end to eccentric pin 135 and at its other end to a further crank arm 137 keyed to the free end of shaft 50 of nozzle mechanism 46. A cam disc 138 mounted on shaft 132 actuates, once per revolution, a micro-switch 139 mounted on platform 125.

Clutch 126 couples shaft 123 with a further shaft 140 which drives, through a reducing gear assembly 141, a vertical cam shaft 142. The upper end of shaft 142 carries a cam disc 143 having a sequence of fingers 144 which actuate a microswitch 145 mounted on a flange 146 upstanding from platform 125. A further micro-switch 147 mounted on flange 146 is actuated by a cam shoulder 148. The lower end of shaft 142 carries a second cam disc 149 having a shoulder 150 which actuates a follower 151 mounted on a lever arm 152 pivoted horizontally about a pin 153 mounted on top 63 of housing 40 and spring-biased towards cam 149. The free end of bar 152 overhangs the edge of top 63 and through a series of linkages 154 is adapted to rotate bar 107 axially. Bar 152 also actuates a micro-switch 155 mounted on top 63 of housing 40. Rod 113 pivotally connected at one end on post 112 of carriage 100, is pivotally connected at its other end to cam disc 149 through an eccentric pin 156.

To withdraw from chamber 41 the fine abraded material removed from bands 12, a suction apparatus 160 is provided as shown in FIGURE 1 of the drawings. An aperture 161 in the back wall 162 of housing 40 leads into a plenum chamber 163 attached to the back wall of the housing. A baffle plate 164 mounted within chamber 41 on back wall 162 and standing out therefrom by means of pins 165 prevents the heavier particles of grit from entering aperture 161. A second baffle 166 within plenum chamber 163 provides a further block for the heavier particles of grit which may enter the plenum chamber, allowing them to re-enter bin 53 through a bottom chute 167. The lighter dust particles are drawn through an outlet aperture 168 into a dust collector 169. Suction for apparatus 160 is provided by an outlet blower 170.

To operate abrading apparatus 20 a pair of continuous bands 12 of moulded combs 13 (the combs being in back-to-back relationship) are passed from moulding die 10 through ingress blocks 42 across chamber 41 and out through brushing and cutting apparatus 30. To do this it is necessary to have clamp 45 and clamps 80 in an open position. Carriage 100 is withdrawn outwardly from chamber 41 to its farthest position. Pairs of blocks 15 on bands 12 are aligned with clamps 80 and the clamps closed about them and clamp 45 is also closed. This is the position shown in FIGURE 4 of the drawings. Motor 120 is now started and cam 143 operated. The first in the sequence of fingers 144 actuates switch 145 which disengages clutch 126, applies brake 128, releases brake 129 and engages clutch 127 which drives shafts 130, 132 and oscillates nozzle mechanism 46. When two passes have been completed by nozzles 47 across the path of bands 12 and disc 134 has completed one revolution, cam 138 actuates micro-switch 139 to disengage clutch 127, apply brake 129, and engage clutch 126, at the same time releasing clamp 45 and closing the valves of air hoses 54 to shut off air and grit flow from nozzles 47. This drives shafts 140, 142 and rotates cams 143 and 149. Cam 149, rotating in a counter-clockwise direction as shown in FIGURE 4, advances carriage 100 forwardly into chamber 41 and hence moves clamps 80 forwardly which carry bands 12 with them. After a time interval which advances bands 12 one step to a position where the next area of flash is to be removed, micro-switch 145 is actuated by the next finger 144 on cam 143 which closes clamp 45, opens the air valves of hoses 54, disengages clutch 126, applies brake 128, releases brake 129, and engages clutch 127 causing nozzles 47 to make another two passes across the path of bands 12. On completion of the two pass cycle of nozzle mechanism 46, cam 138 again actuates micro-switch 139 to disengage clutch 127, release brake 129, apply brake 128, and engage clutch 126 whereupon cams 143 and 149 again begin to rotate. Bands 12 are advanced, in this manner, sequentially with the actuation of nozzle mechanism 46 until cam 149 has rotated approximately 180 degrees whereupon, with nozzle mechanism 46 inoperative, cam follower 151 rides up on the shoulder 150 of cam 149 to push arm 152 outwards and cause rod 107 to rotate through the action of linkage 154. The rotation of bar 107 causes flange 108 to bear against pin 109 on link bar 87, moving the link bar along guideway 88 and rotating shafts 83 to open clamps 80. At this point in the cycle, rod 113 has reached its maximum forward point of movement and begins to move rearwardly again as cam 149 continues to rotate, carrying carriage 100 with it. When carriage 100 has reached is rearward limit of travel cam follower 151 moves off shoulder 150 of cam 149, carrying rod 152 with it. The inward lateral movement of bar 152 and consequent movement of linkage 154 rotates flange 108 away from pin 109 which releases spring-biased link bar 87 and rotates shafts 83 to close clamps 80. The inward lateral movement of bar 152 towards cam 149 also actuates micro-switch 155 which disengages clutch 126, applies brake 128, releases brake 129, and engages clutch 127, whereupon the whole abrading apparatus 20 repeats the cycle just described. Brakes 128 and 129 are provided to operate with clutches 126 and 127 to ensure a precise timing sequence for operation of the various controlled elements of the apparatus.

It will be seen that fingers 144 are spaced over approximately one-half the perimeter of cam disc 143 and periodically actuates through micro-switch 145, nozzle mechanism 46 in alternation with the forward movement of carriage 100 when cam follower 151 is off shoulder 150 of cam disc 149 and clamps 80 are closed. When follower 151 is on shoulder 150 which extends approximately one-half the perimeter of cam disc 149, fingers 144 are out of the region of switch 145. Consequently nozzle mechanism 46 cannot operate when clamps 80 are open.

During this forward movement of carriage 100 and clamps 80, and hence bands 12, micro-switch 111 on frame 106 is periodically actuated by lugs 110 to operate cutting knife 33 and sever individual combs 13 from the bands. In the apparatus illustrated in the drawings, each band 12 is advanced through seven grit blasting stations extending through two back-to-back combs 13, as shown more clearly in FIGURE 7 of the drawings. This requires two operations of cutting knife 33.

In order that abrading apparatus 20 will not advance bands 12 faster than they are fed from moulding die 10, microswitch 147 is actuated by shoulder 148 at the end of the cycle to break the circuit feeding motor 120. A signal from die 10 or from an operator closes the circuit to motor 120 when a sufficient length of bands 12 have issued from the die.

It will be appreciated that at the beginning of the cycle ducts 60 are of a length and position such that mouth 67 of inlet 64 is immediately above the first set of jaws adjacent end wall 45 of housing 40 while outlet 66 is immediately above the second and forward set of clamps, the two sets of clamps being spaced exactly the length between two sets of back-to-back blocks 15 in bands 12. In other words, the horizontal distance between the transverse centre lines of inlets 64 and outlet 66, and also the distance between the two sets of clamps 80 associated with each band 12, is equal to the length of two combs 13.

We claim:

1. A method of abrading an article of a structure permitting transverse passage of particulate abrasive material therethrough, comprising the steps of directing particulate abrasive material against one side of the article, collecting on the other side of the article material passing therethrough, accelerating the collected material while, in movement and redirecting the collected material against the other side of the article at an area spaced from the area of collection.

2. A method as claimed in claim 1 in which the article is advanced in a path traversing the two areas.

3. A method as claimed in claim 1 in which the article is in strip form and is advanced step by step in a path traversing the two areas whereby the particulate material is directed against specific areas of the strip.

4. A method as claimed in claim 1 in which the material is collected in, accelerated through, and redirected by, a venturi passage.

5. A method as claimed in claim 3 in which the material is collected in, accelerated through, and redirected by, a venturi passage.

6. A method of removing flash in the manufacture of wire combs for wire-spring relays in which blocks of insulating material are moulded at spaced intervals along a strip consisting of a plurality of continuous parallel spaced wires, comprising the steps of directing particulate abrasive material against one side of the strip, collecting on the other side of the strip material passing between the spaced wires, accelerating the collected material while in movement, and redirecting the collected material against against the other side of the strip at an area spaced from the area of collection.

7. A method as claimed in claim 6 in which the strip is advanced step by step to direct the particulate material against specific areas of the strip having flash thereon.

8. A method as claimed in claim 7 in which the material is collected in, redirected by, and accelerated through, a venturi passage.

9. Apparatus for abrading articles, comprising means for spraying a particulate abrasive material against one side of an article of a structure allowing passage of the material therethrough and means for redirecting that portion of the moving material passing through the article to impinge upon the other side of the article at a point spaced therefrom, the redirecting means including means to increase the velocity of the redirected material for impingement upon the other side of the article.

10. An apparatus as claimed in claim 9 in which the redirecting means comprises a tubular venturi duct having an inlet end to receive the particulate material first passing through the article and an outlet end adjacent the other side of the article, the tubular duct decreasing in cross-section from the inlet end to the outlet end to achieve the venturi effect.

11. A mechanism for abrading a plurality of combs, of a plurality of spring wires laterally spaced apart in parallel relation to form a continuous comb assembly, which comprises:
 (a) a housing having a chamber therein,
 (b) a pair of guns disposed within the chamber,
 (c) means for oscillating the guns as a whole back and forth,
 (d) an abrasive reservoir connected with the guns, from which the abrasive particles are conveyed to the guns,
 (e) an air inlet means for supplying air to the guns,
 (f) U-shaped hollow members disposed above the comb assembly, adapted to receive a portion of the propelled particles from a first position of a comb and to convey to a second position of a comb,
 (g) exhausting means for withdrawing the particles from the chamber and means for separating dust from the particles,
 (h) means for adjusting the air inlet means and the exhausting means,
 (i) means to return the separated abrasive particles to the chamber,
 (j) means to collect the separated dust.

12. Apparatus for abrading articles comprising:
 (a) means for spraying a particulate abrasive material at one side of the articles, and
 (b) means for redirecting a portion of said material to impinge upon the other side of the articles, said last-named means comprising:
  (i) a tubular member having an inlet end in the path of the particulate material and an outlet end adjacent the other side of the articles,
  (ii) the tubular member decreasing in cross-section from the inlet end to the outlet end to increase the velocity of the particulate material passing therethrough.

13. Apparatus for abrading articles comprising:
 (a) first and second abrading stations,
 (b) means employing a high-velocity air stream to spray a particulate abrasive material at one side of the articles when positioned at the first station,
 (c) tubular means having an inlet end adapted to receive a portion of the air-borne particulate material and an outlet end to direct said material at the other side of the articles at the second station,
 (d) the tubular member being reduced in cross-sectional area from the inlet end to the outlet end to increase the velocity of the air stream passing therethrough with the particulate material, and
 (e) means for moving the articles between the stations.

14. Apparatus for abrading articles comprising:
 (a) first and second abrading stations,
 (b) means for moving articles from the first station to the second station so that articles are positioned at both stations simultaneously,
 (c) a supply of particulate abrasive material,
 (d) nozzle means connected to said supply and utilizing high-pressure air to form a spray of particulate material, said nozzle means being positioned to direct said spray toward one side of the articles at the first station,
 (e) tube means having one end adjacent the other side of the articles at the first station for receiving particulate material passing by the articles, the other end of the tube means being positioned to direct the particulate material at the other side of the articles at the second station,
 (f) the tube means having a decreasing cross-section from said one end to the other whereby the velocity of the particulate material increases as it passes through the tube means.

15. Flash removing apparatus for use in the manufacture of wire combs for wire-spring relays in which blocks of insulating material are molded at spaced intervals along a plurality of continuous parallel spaced wires, said apparatus comprising:
 (a) a first abrading station,
 (b) means for intermittently moving the wires longitudinally to position the blocks in sequence at the first station,
 (c) a second abrading station spaced from the first station longitudinally of the wires such that a block is positioned at the second station when a block is in position at the first station,
 (d) a supply of particulate abrasive material,
 (e) a nozzle communicating with said supply and adapted to utilize a high-velocity air stream to spray the particulate material at the blocks from one side thereof at the first station to remove flash remaining from the molding of the blocks, and
 (f) a tubular member having an inlet end adjacent the other side of the blocks at the first station to receive particulate material passing beyond the blocks, (g) the tubular member having an outlet end to direct the particulate material passing therethrough to impinge upon the blocks from said other side at the second station, and (h) the tubular member decreasing in cross-section from the inlet end to the outlet end to increase the velocity of the air-borne particulate material passing therethrough.

16. Flash removing apparatus as defined in claim 15 in which the second station is spaced from the first station in the direction of movement of the wires.

17. Flash removing apparatus as defined in claim 16 having (a) two nozzles for spraying particulate material generally at opposite ends of each block, and (b) separate tubular members for receiving particulate material passing beyond the blocks from the respective nozzles, the outlet ends being positioned to direct the particulate material passing therethrough at opposite ends of the blocks at the second station.

18. Flash removing apparatus as defined in claim 15 in which (a) the nozzle is arranged so that the spray of particulate material exceeds the transverse dimension of the blocks, and (b) the inlet end of the tubular member is adapted to receive the spray passing beyond the sides of the blocks.

19. Flash removing apparatus for use in the manufacture of wire combs for wire-spring relays in which blocks of plastic are molded at spaced intervals along a plurality of continuous parallel spaced wires disposed in one plane, said apparatus comprising:

(a) first and second abrading stations, (b) means for intermittently advancing the wires longitudinally to position the blocks in sequency at the stations, said stations benig spaced apart such that blocks are in position at both stations simultaneously, (c) a supply of particulate abrasive material, (d) a source of high pressure air, (e) a pair of pivotally mounted nozzles connected to said supply and the source of air and adapted to project a high velocity spray of air-borne particulate material, (f) means for pivoting the nozzles to sweep the spray across one side of the blocks at the first station, the distance swept being greater than the width of the blocks transversely of the wires, (g) said nozzles being arranged to direct the respective sprays at opposite ends of the blocks, (h) a pair of tubular members having inlet ends adjacent the other side of the blocks at the first station to receive the air-borne particulate material passing thereby from the respective nozzles, the inlet ends being of a size to cover substantially the total distance swept by the sprays, (i) the tubular members having outlet ends located to direct the particulate material at opposite ends of the blocks from said other side at the second station, (j) the tubular members gradually decreasing in cross-sectional area from the inlet ends to the outlet ends to increase the velocity of the air-borne particulate material passing therethrough.

References Cited

UNITED STATES PATENTS

| | | | |
|---|---|---|---|
| 365,261 | 6/1887 | King et al. | 51—14 |
| 1,200,469 | 10/1916 | Dawes | 51—14 |
| 2,131,767 | 10/1938 | Turnbull | 51—9 |
| 2,204,588 | 6/1940 | Guite | 51—14 X |

LESTER M. SWINGLE, *Primary Examiner.*